(12) United States Patent
Ewell et al.

(10) Patent No.: US 7,009,977 B1
(45) Date of Patent: Mar. 7, 2006

(54) METHOD AND SYSTEM FOR EXPANDING SERVICES IN A DIGITAL LOOP CARRIER SYSTEM

(75) Inventors: LuJack Ewell, Buford, GA (US); John Mantovani, Suwanee, GA (US); Randy Holzworth, Duluth, GA (US)

(73) Assignee: Conklin Corporation, Pleasant Valley, NY (US)

( * ) Notice: Subject to any disclaimer, the term of this patent is extended or adjusted under 35 U.S.C. 154(b) by 823 days.

(21) Appl. No.: 09/877,410

(22) Filed: Jun. 8, 2001

Related U.S. Application Data (60) Provisional application No. 60/210,352, filed on Jun. 9, 2000.

(51) Int. Cl.
*H04L 12/66* (2006.01)
(52) U.S. Cl. .................... 370/395.1; 370/395.5
(58) Field of Classification Search ................ 370/217, 370/254, 413.02, 222, 390, 535, 352, 465, 370/466, 395.1, 395.5, 395.6, 395.61
See application file for complete search history.

(56) References Cited

U.S. PATENT DOCUMENTS

| | | | | |
|---|---|---|---|---|
| 6,438,144 B1 * | 8/2002 | Guzikevits et al. | ......... | 370/535 |
| 6,459,699 B1 * | 10/2002 | Kimura et al. | ............... | 370/396 |
| 6,680,904 B1 * | 1/2004 | Kaplan et al. | ............... | 370/217 |
| 6,731,607 B1 * | 5/2004 | Mantin | ........................ | 370/254 |
| 6,792,002 B1 * | 9/2004 | Tezuka et al. | ............... | 370/474 |
| 6,822,944 B1 * | 11/2004 | Mantin | ........................ | 370/254 |
| 2002/0172273 A1 * | 11/2002 | Baker et al. | ................. | 375/222 |
| 2004/0037280 A1 * | 2/2004 | Hein et al. | .................... | 370/390 |
| 2004/0141609 A1 * | 7/2004 | Shi | ......................... | 379/413.02 |

* cited by examiner

*Primary Examiner*—Melvin Marcelo
(74) *Attorney, Agent, or Firm*—King & Spalding LLP (57) ABSTRACT

Expanding the number of telecommunication services ports, such as ATM-compatible ports, by linking a master unit comprising a fixed number of ATM-compatible ports with one or more expansion units comprising supplemental ATM-compatible ports. A flexible expansion link can be connected between a pair of expansion units to form a chain of expansion units. The master unit can be connected to the chain of expansion units via a flexible expansion link. This combination of a master unit and one or more linked expansion units provides a scaleable deployment solution for the provisioning of ATM-compatible services to the subscriber base of a service provider. The master unit can send a continuous data stream in the downstream path to the chain of expansion units. The expansion units can synchronize to the framing pattern of the downstream data output by the master unit and extract information intended for a particular expansion unit from the framing pattern. The last expansion unit in the chain can loop the data stream in the upstream direction toward the master unit. Any information intended for the master unit can be inserted into the upstream data by an expansion unit. The framing pattern transports input/output data, ATM cell data, and a clock reference signal to support communications in the downstream and upstream data paths between the master unit and the chain of expansion units.

15 Claims, 6 Drawing Sheets

METHOD AND SYSTEM FOR EXPANDING SERVICES IN A DIGITAL LOOP CARRIER SYSTEM

RELATED APPLICATION

This application claims priority under 35 U.S.C. § 119 to U.S. Provisional Patent Application Ser. No. 60/210,352, filed on Jun. 9, 2000, entitled "Expansion Systems for Adding Channels to Telephony Equipment."

TECHNICAL FIELD

The present invention is generally directed to the expansion of telephony services in a Digital Loop Carrier (DLC) system, typically within a DLC field cabinet, or at a Central Office (CO) of a small telephone company. Specifically, the invention provides a master unit and one or more expansion units, each coupled via an expansion link, to expand an existing capacity to deliver telecommunication services, such as Asynchronous Transport Mode (ATM)-compatible services, via additional channels or ports.

BACKGROUND OF THE INVENTION

Approximately 50 million subscribers access the Public Switched Telephone Network (PSTN) via DLC systems in North America. These subscribers are now demanding that their service providers support Digital Subscriber Line (DSL) services to enable the subscribers to obtain high-speed Internet access and data services. Although the service providers, typically Local Exchange Carriers (LECs), desire to offer the DSL services to their subscribers, the LECs face several problems with deploying the equipment required to support DSL services in existing DLC systems. For example, in the absence of remote access equipment, the LEC can not reliably provide DSL services to a subscriber that is located more than a few thousand feet from the CO. For subscribers in remote locations that are serviced via remote access equipment, such as a DLC system, the LEC may find that the existing DLC system lacks the physical infrastructure to support the addition of a sufficient number DSL channels to satisfy subscriber demand.

The LEC may elect to use a rack-mounted DSL Access Multiplexer (DSLAM) within the DLC field cabinet to support the distribution of DSL services in locations remote from the CO. The LEC may install the DSLAM at the DLC if physical space is available within the DLC field cabinet to accommodate installation of that rack-mountable device and if subscriber demand for DSL services is sufficient to warrant the purchase and installation of the DSLAM. The DSLAM manages the distribution of data in the downstream path, toward the subscriber, and in the upstream path, toward the data network. In the downstream path, on a packet-by-packet basis, the DSLAM determines which subscriber or DSL channel each data packet is intended for and routes it to the appropriate subscriber. In the upstream path, the DSLAM collects the data packets from each of the DSL channels, buffers the data packets, and transmits the data packets toward the data network, such as a network supporting the ATM protocol.

Figure 1A:
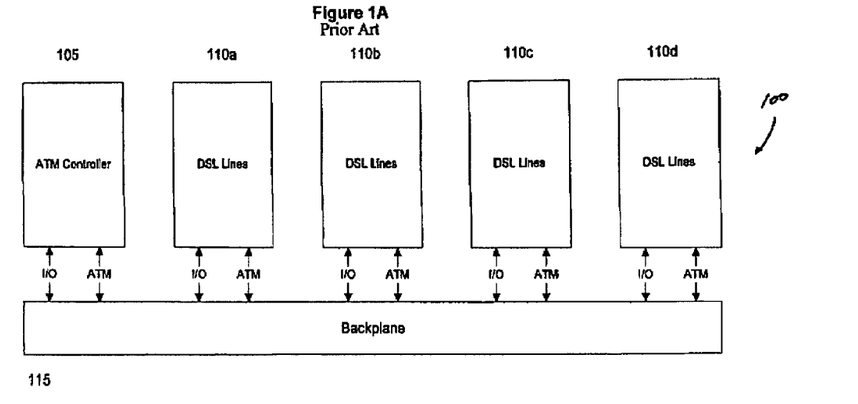
FIG. 1A is a block diagram of the primary components of a prior art DSLAM system.

FIG. 1A is a block diagram illustrating the architecture for a DSLAM configured for installation within an available rack within a DLC field cabinet. As shown in FIG. 1A, a DSLAM is typically implemented as an assembly of circuit boards connected to a common backplane in an equipment bay of the DLC system. For a representative DSLAM 100, the circuit boards typically include a common ATM controller 105 and multiple DSL port boards 110a–110d. Each DSL port board 110a–110d typically includes multiple DSL port circuits or lines. A backplane provides a common bus structure that communicates the Input/Output (I/O) and ATM signals between the circuit cards. Specifically, I/O and ATM signals are communicated between the backplane 115 and the ATM Controller 105 and the DSL port boards 110a–110d. The backplane 115 typically includes circuit board receptacles that accept the insertion of the ATM controller 105 and the DSL port boards 110a–110d.

For many DLC systems installed by LECs prior to the advent of DSL services, the DLC field cabinet fails to contain a DSLAM or sufficient cabinet space to accommodate the installation of a rack-mounted DSLAM. Moreover, the LEC is likely to find it costly to install a DSLAM within the DLC field cabinet if that DSLAM services only a small number of subscribers in a location remote from the CO. To address these concerns, LECs may elect to install smaller DSLAM-like multiplexers, referred to as mini-Remote Access Multiplexers or mini-RAMs, within the DLC field cabinet. A mini-RAM is typically designed to serve a relatively small number of DSL subscribers and includes a physically small form-factor suitable for installation in a field cabinet. Similar to the design of a representative DSLAM, a mini-RAM typically includes an ATM controller and one or more DSL port cards, each connected to a common backplane for the distribution of ATM and I/O signals.

Although DSLAMs and mini-RAMS represent potential solutions to the distribution of DSL services to remote subscribers, DLC field cabinets represent a complex environment in which to install such additional equipment. Field cabinets are often completely or nearly full of rack-mounted devices, thereby leading the LEC to conclude that it is not possible or at least not advisable to install additional equipment at the DLC. Moreover, the installation of new equipment within a DLC field cabinet often results in a complicated rewiring of the electrical power bus.

In view of the foregoing, there is a need to provide telecommunication services, such as ATM, Multiple Protocol Label Switching (MPLS) or Frame Relay services, to remote subscribers serviced by a DLC or CO without installing additional large form-factor equipment within a field cabinet or requiring a complicated rewiring of telephony equipment. There is a further need to extend such telecommunication services capability to the installed base of older DLC systems and to expand the delivery of advanced data by both existing and newer DLCs. The present invention solves these needs by providing an expandable capability to deliver telecommunications services with a master unit and one or more expansion units, each coupled to a flexible expansion link, for installation within the existing space of a DLC field cabinet or a CO.

SUMMARY OF THE INVENTION

The present invention provides for the expansion of telecommunications services, such as ATM, MPLS or Frame Relay-compatible services, to subscribers that are typically located remote from the CO and serviced by a DLC system. Based on an expandable architecture of a master unit and one or more expansion units connected via flexible expansion links, the present invention is suitable for installation within a device-crowded field cabinet of a DLC system. This combination of a master unit and one or more linked expansion units provides a scaleable deployment solution for the provisioning of telecommunication services to a few or many subscribers. For example, as the base of subscribers of ATM-compatible services increases over time, an LEC can add to the DLC only those expansion units required to service new subscribers. This provides the LEC with an improved economic correlation between the anticipated demand for telecommunication services, including ATM-compatible services, and the LEC's investment in capacity to service those demands.

In general, the present invention provides a system for delivering an expanded set of telecommunication services, such as ATM, MPLS or Frame Relay-compatible services, to subscribers services by a DLC or CO. A master unit, coupled to a wide area network (WAN), is operable to process telecommunication service signals for communication with the WAN and with a fixed number of telecommunication service interfaces at the master unit. An expansion unit, coupled to the master unit via an expansion link, is operable to (1) transmit telecommunication service signals in the upstream direction via the expansion link for processing by the master unit and to (2) receive telecommunication service signals in the downstream direction from the master unit via the expansion link for delivery to an expansion set of telecommunication service interfaces. A second expansion unit, coupled to the expansion unit via a second expansion link, is operable to (1) transmit telecommunication service signals in the upstream direction via a combination of the expansion unit and the pair of expansion links for processing by the master unit and to (2) receive telecommunication service signals in the downstream direction from the master unit via a combination of the expansion unit and the pair of expansion links for delivery to the second expansion set of telecommunication service interfaces.

For one aspect of the present invention, a combination of a master unit and one or more expansion units support the delivery of an expanded set of ATM-compatible services to subscribers. Both the master unit and each expansion unit can accept and transmit Plain Old Telephone Service (POTS) signals, typically via an interface to a DLC or a CO. The master unit is also coupled to a WAN, such as an ATM-compatible network, whereas a chain of one or more expansion units is coupled to the master unit via a flexible expansion link or cable. The master unit typically comprises a controller for processing ATM-cells, a fixed number of DSL interfaces and an expansion function. Each expansion unit typically comprises multiple DSL interfaces and an expansion function and can be connected downstream from the master unit via a flexible expansion link. The expansion link transports a data stream typically comprising processor address/data, ATM cells, and a clock reference signal.

In support of the delivery of an expanded set of ATM-compatible services, the master unit can send a continuous data stream of ATM cells, I/O signals and a clock reference signal in the downstream path to the expansion units. The expansion units can synchronize to the framing pattern of the downstream data output by the master unit and extract information intended for a particular expansion unit from the framing pattern. The last expansion unit in the chain can loop the data stream in the upstream direction toward the master unit. Any information intended for the master unit can be inserted into the upstream data by an expansion unit in the linked chain of expansion units.

For another aspect of the present invention, the master unit provides a fixed number of T-1 interfaces coupled to an ATM network, a fixed number of local DSL ports, an ATM controller supporting local and remote cell processing functions, and an expansion port for connecting to expansion units. This master unit is typically installed within a DLC field cabinet and provides DSL service for a fixed number of subscribers. Each remote expansion unit comprises supplemental DSL ports, an input expansion port, and an output expansion port. An expansion unit can be coupled to the master unit via a flexible expansion link connected to the expansion port of the master unit and an input expansion port of the expansion unit. In turn, a flexible expansion link can be connected between the output expansion port of the initial expansion unit and an input expansion port of another expansion unit to provide additional DSL ports as needed by the LEC to support subscribers. The linked expansion units can be placed side-by-side within the DLC field cabinet or at various locations within the cabinet where room is available. The flexible architecture of a master unit and one or more expansion units makes it possible to deliver DSL services from a field cabinet that an LEC would have otherwise classified as full and unavailable for an expansion of data services.

DETAILED DESCRIPTION OF THE EXEMPLARY EMBODIMENTS

The present invention supports the distribution of telecommunications services, such as ATM, MPLS or Frame Relay-compatible services via a flexible, modular architecture comprising a master unit and one or more expansion units linked by flexible expansion links. For example, the present invention can support the delivery of an expanded set of ATM-compatible services, including DSL services, by DLC systems having remote field cabinet installations and by COs operated by small telephone companies. Using a modular approach for the provisioning of ATM-compatible ports, the present invention can be installed within a field cabinet in which sufficient installation space would be unavailable for a conventional port expansion solution involving one or more rack-mounted devices.

In general, the present invention comprises a master unit and one or more expansion units, each coupled via an expansion link carrying downstream and upstream communications. For a representative application of delivering DSL services to subscribers, the master unit typically includes T1 interfaces for connection to a WAN, such as a packet-switched network, multiple DSL ports, an ATM controller for local and remote ATM cell processing functions, and an expansion port for connection to an expansion unit via an expansion link. Each expansion unit can include additional DSL ports and both input and output expansion ports. The first expansion unit in a chain of expansion units is connected to the master unit by coupling an expansion link, typically a serial data link comprising a flexible cable, between the expansion port of the master unit and the input expansion port of the expansion unit. In turn, the output expansion port of the expansion unit can be used to connect to the next expansion unit within the chain.

Significantly, the expansion units can be placed within the field cabinet either side-by-side or anywhere within the field cabinet that includes sufficient installation space for an expansion unit. By taking full advantage of a modular design and the flexible expansion links, the master unit and expansion unit(s) can be placed in various locations within a sealed cabinet. This makes it possible to deliver ATM services (or other telecommunication services, such as MPLS or Frame Relay services) from a field cabinet that has previously been considered to be full of equipment and unavailable for service expansion.

Figure 1B:
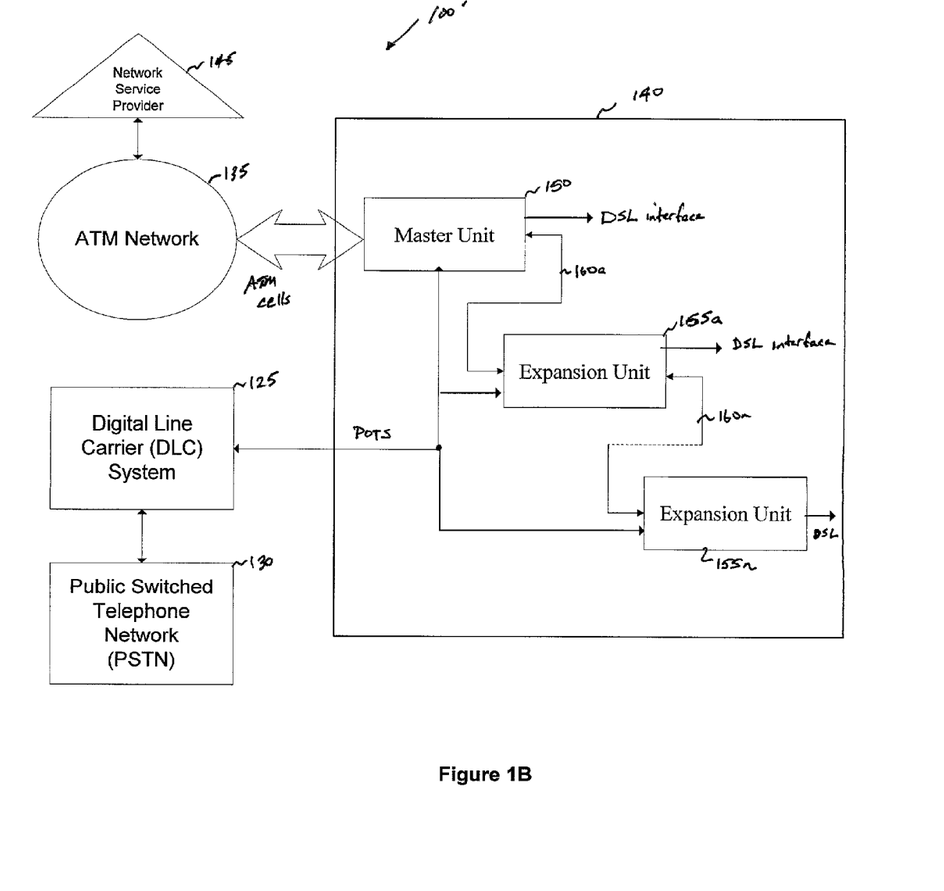
FIG. 1B is a block diagram illustrating a master unit and multiple linked expansion units constructed in accordance with an exemplary embodiment of a present invention.

Turning now to the drawings, in which like reference elements identify like components of the illustrated exemplary embodiments, FIG. 1B is a block diagram illustrating a representative operating environment for an exemplary embodiment of the present invention. As shown in FIG. 1B, this representative telephony operating environment 100' comprises a DLC system 125, a PSTN 130, a WAN comprising an ATM network 135, and a DSLAM 140. The PSTN 130 is coupled to the DLC 125, thereby enabling the DLC 125 to provide POTS signals to the DSLAM 140. The ATM network 135 provides T1 access to the DSLAM 140, thereby supporting an exchange of ATM-compatible signals, including DSL signals, for communication between the DSLAM 140 and one or more network service providers (NSP) 145. The DSLAM 140 provides multiple ATM-compatible ports, typically DSL ports, for access by subscribers of services provided by a LEC. The DSLAM 140 is typically installed within the field cabinet of the DLC 125, which is typically in a location remote from the CO.

Although FIG. 1B illustrates the use of the PSTN 130 to deliver POTS signals to the DLC 125, it will be appreciated that a "voice over Internet Protocol (IP)" system can be used in the place of the PSTN to deliver voice telephony signals in packet format via a WAN, such as the Internet. Moreover, other representative telephony operating environments supported by embodiments of the present invention can include a WAN supporting the communication of MPLS or Frame Relay signals. The following description of an exemplary ATM-compatible network supporting the delivery of DSL services is intended to provide a representative example of only one of the WANs supported by embodiments of the present invention.

The DSLAM 140 comprises a master unit 150 and one or more expansion units 155a–155n. The initial expansion unit 155a is coupled to the master unit 150 via an expansion link 160a. An additional expansion unit, such as the expansion unit 155n, can be connected to expansion unit 155a via an expansion link 160n. In this manner, a chain of expansion units 155 can be constructed by connecting an expansion link 160 between the output port of one expansion unit 155 and the input port of a subsequent expansion unit 155. While the master unit 150 is connected to both the DLC 125 and to the ATM network 135, an expansion unit 155 is either connected directly to the master unit 150 or to another expansion unit via an expansion link 160. In addition, the expansion unit 150 and each expansion unit 155 can be connected to the DLC 125 for access to POTS signals.

The master unit 150 and each expansion unit 155 provide ATM-compatible interfaces or ports, typically DSL ports, for communication of ATM cells and POTS signals with subscribers serviced by the master unit. The master unit 150 typically supports a fixed number of local DSL ports, whereas each expansion unit 155 can support an expansion set of DSL ports remote to the master unit. Additional ATM-compatible ports can be provided to subscribers desiring such services by adding one or more expansion units 155 to supplement the fixed number of ports provided by the master unit 150. Both the master unit 150 and each expansion unit 155 represent small form-factor devices. A flexible serial interface cable typically implements the expansion link 160. The combination of small form-factor devices and flexible cabling links provides an installer with an opportunity to design a creative installation of the DSLAM 140 within a crowded field cabinet.

As a representative example, the master unit 150 can provide DSL service to a fixed number of subscribers, typically four subscribers corresponding to four DSL ports supported by the master unit. In the event that a fifth subscriber desires DSL service, the LEC can install an expansion unit 155 within the field cabinet of the DLC 125 for connection to the master unit 150 via an expansion link 160. The combination of the master unit 150 and the expansion unit 155 can deliver DSL services to an additional set of subscribers based upon a fixed number of additional DSL ports, typically 6 DSL ports, supported by the expansion unit.

For an exemplary embodiment, the master unit 150 comprises multiple POTS interfaces coupled to the DLC 125, multiple T1 interfaces coupled to the ATM network 135, a fixed number of ATM-compatible interfaces or ports, and an expansion port for connection to an expansion unit 155. The master unit 150 is responsible for processing ATM cells for both local and remote operations and for communicating the ATM cells with both the ATM network 135 and the local and remote ATM-compatible interfaces. The master unit 150 can process ATM cells at the local level for the ATM-compatible interfaces of the master unit and at the remote level for the ATM-compatible interfaces of the expansion units 155. Although the ATM-compatible interfaces are typically DSL ports, those skilled in the art will appreciate that other ATM-compatible services include DS3, SONET, T1, and HSDL. Moreover, the present invention can support the expanded delivery of telecommunication services other than ATM services, including MPLS and Frame Relay-compatible services.

Each expansion unit 155 comprises an expansion function including an input expansion port and an output expansion port and a fixed number of ATM-compatible ports, typically DSL ports. The input expansion port can be coupled to either the master unit 150 or to another expansion unit 155. In contrast, the output expansion port is connected to another expansion unit 155 if additional ATM-compatible ports are required to service the needs of subscribers for such services. Otherwise, the output expansion port can remain unused until an additional expansion capability is required at the DLC 125. A POTS interface is provided by a connection of each expansion unit 155 to the DLC 125.

In an exemplary chain of a pair of expansion units 155 supporting the delivery of ATM services, the first expansion unit 155a is coupled to the master unit via an expansion link. This expansion unit 155a can (1) transmit ATM cells signals in the upstream direction via the expansion link 160a for processing by the master unit 150 and (2) receive ATM cells in the downstream direction from the master unit 150 via the expansion link 160a for delivery to its expansion set ATM-compatible interfaces. A second expansion unit 155n can be coupled to the expansion unit 155a via a second expansion link 155n. The second expansion unit 155n can transmit ATM cells in the upstream direction via a combination of the expansion unit 155a and the pair of expansion links 160a and 160n for processing by the master unit 150. This second expansion unit 155n can also receive ATM cells in the downstream direction from the master unit 150 via a combination of the expansion unit 155a and the pair of expansion links 160a and 160n for delivery to its expansion set of ATM-compatible interfaces.

The expansion link 160 is used to connect the master unit 150 to the initial expansion 155a or to connect a pair of expansion units 155, as described above. The expansion link 160 is preferably implemented by a flexible cable supporting a serial interface, such as the Low Voltage Differential Signal (LVDS) serial interface. The flexible nature of the preferred expansion link 160 allows each expansion unit 155 to be placed at various locations within the field cabinet of the DLC 125. The small form-factor of the expansion units, coupled with the flexibility of the expansion link, makes it possible to expand the capability to deliver ATM-compatible services from a field cabinet that otherwise would be considered to be full of equipment and unavailable for service expansion.

The modular expansion approach supported by the exemplary combination of a master unit and one or more expansion units also enables a LEC or another service provider to add only the equipment required to support the present needs of subscribers for ATM-compatible services. In other words, the expansion solution supported by this exemplary embodiment offers a service provider with a "pay-as you grow" option for obtaining a DSLAM for installation within a field cabinet of a DLC system. If the demand for ATM-compatible services never grows beyond the small number ATM-compatible ports provided by the master unit 150, the LEC can rely upon the master unit to service those subscribers without purchasing other ATM-compatible ports that would remain unused by present describer demand. If, on the other hand, the demand for ATM-compatible services expands beyond the fixed number of ports provided by the master unit 150, the LEC can install one or more expansion units 155 to increase the number of available ATM-compatible ports.

Figure 2A:
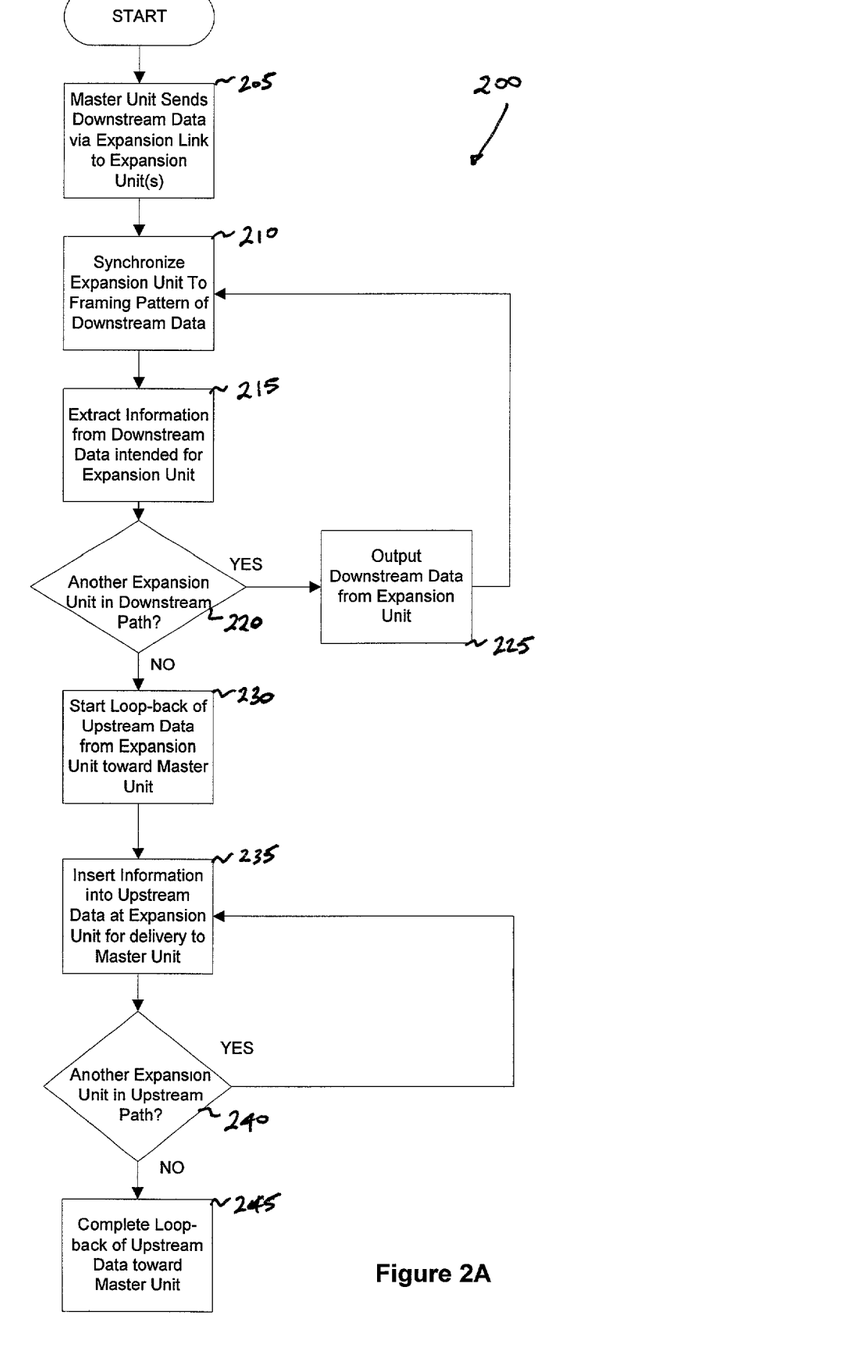
FIG. 2A is a logical flow chart diagram illustrating the exchange of data in the downstream and upstream directions between a master unit and one or more expansion units in accordance with an exemplary embodiment of the present invention.

FIG. 2A is a logical flow chart diagram illustrating communications between a master unit and one or more expansion units in both the downstream and upstream directions in accordance with an exemplary embodiment of the present invention. Turning now to FIGS. 1B and 2A, an exemplary communication process 200 is initiated at the START step and proceeds step 205. The master unit 150 in step 205 transmits downstream data to the initial expansion unit 155 via an expansion link 160. In step 210, the expansion unit 155 completes a synchronization operation to synchronize the unit to the downstream data output by the master unit 150. The expansion unit 155 extracts information intended for that unit from the downstream data in step 215. In decision step 220, an inquiry is conducted to determine whether another expansion unit 155 is connected downstream in a chain of expansion units. If the response to this inquiry is negative, the "NO" branch is followed from decision step 220 to step 230. Otherwise, the "YES" branch is followed from the decision step to 220 to step 225 and the downstream data is output to the downstream expansion unit. In turn, a loop is followed from step 225 to step 210 to complete the synchronization and information extraction operations for that downstream expansion unit.

In step 230, the expansion unit operating at the end of the chain of expansion units generates upstream data by looping the downstream data in the upstream direction toward the master unit 150. In step 235, the expansion unit 155 inserts information within the upstream data and outputs the upstream data for eventual delivery to the master unit 150.

In decision step 240, an inquiry is conducted to determine whether another expansion unit is located in the upstream direction. If so, the "YES" branch is followed from step 240 to step 235. This allows the next expansion unit in the upstream direction to insert information within the upstream data path. If, on the other hand, the response to the inquiry in decision step 240 is negative, the "NO" branch is followed to step 245. In step 245, the upstream data path is completed at the master unit 150.

Turning again to FIG. 1B, the expansion link 160 generally carries three types of signals, namely a clock signal, downstream data, and upstream data. For an exemplary embodiment, the clock signal is generated by a 35.328 MHz clock housed in the master unit 150. This 35.328 MHz clock signal is output by the master unit 150 via the expansion link 160 to the first expansion unit 155. The expansion unit 155 regenerates this clock signal and outputs the regenerated clock signal to the next downstream expansion unit within a chain of expansion units. At each expansion unit, the clock signal is preferably regenerated for forwarding to the next downstream expansion unit.

The second type of signal carried by the expansion link 160 is downstream data. Each expansion unit 155 clocks in the downstream data with the falling edge of the 35.328 MHz clock and clocks out the downstream data to the next downstream expansion unit with the rising edge of the clock signal.

Upstream data represents the third type of signal carried by the expansion link 160. The upstream data represents the downstream data that is returned toward the master unit 150 in the upstream direction by the last expansion unit 155 within a chain of expansion units. Each expansion unit 155 samples the upstream data on the rising edge of the clock signal and outputs the upstream data to the next expansion unit (or master unit) in the chain.

Figure 2B:
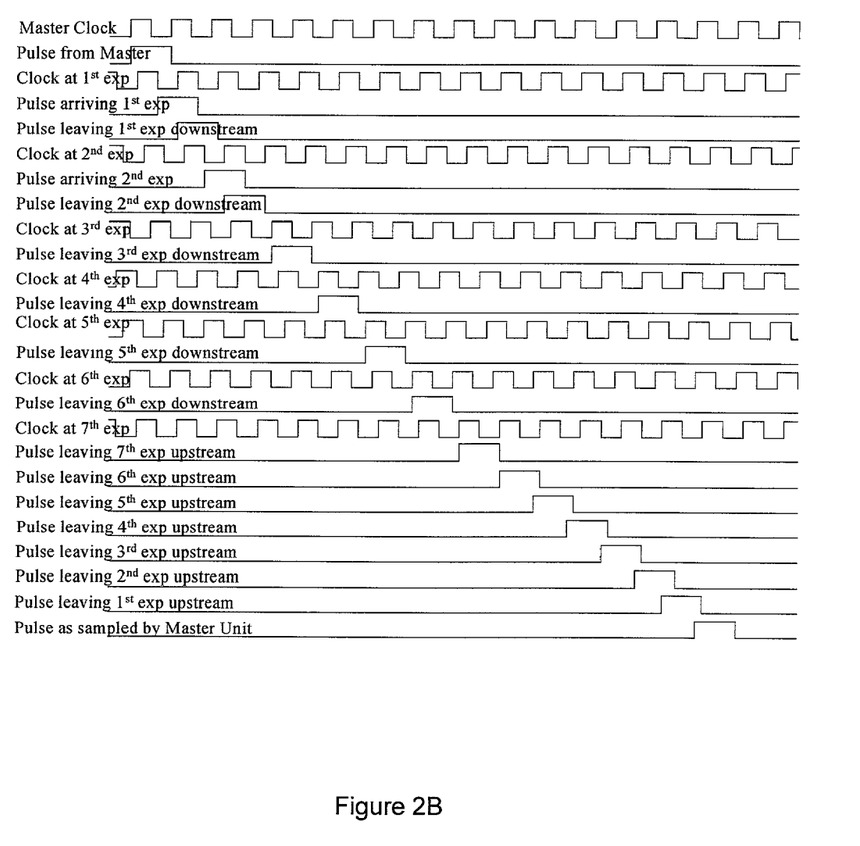
FIG. 2B is a filming diagram illustrating a clock signal, downstream data, and upstream data for a master unit and a chain of seven expansion units in accordance with an exemplary embodiment of the present invention.

FIG. 2B is a representative timing diagram illustrating the communication of a clock signal, downstream data, and upstream data for a master unit and a total of seven expansion units linked by expansion links in accordance with an exemplary embodiment of the present invention. Referring to FIG. 2B, each expansion unit adds one clock cycle of delay in the downstream direction and one clock cycle of delay in the upstream direction. For the representative example of a chain of seven expansion units, the latency of the entire chain is 14 clock cycles. The protocol for the framing sequence of the datastream carried by the expansion link enables each expansion unit to recognize its position in the chain of expansion units. An exemplary protocol for the framing sequence will be described below in connection with Tables I and II.

As the last expansion unit in the chain recognizes its position as the chain end, it will delay the return of the data stream in the upstream direction so that the master unit 150 receives the upstream data 14 clock cycles after the initial transmission of the downstream data by the master unit. Consequently, a downstream expansion unit can be added within the chain without shifting the upstream framing sequence based upon this application of chain delay. In other words, the addition of a new expansion unit within the chain is transparent to all units with the exception of the last expansion unit in the chain.

As illustrated by the timing diagram in FIG. 2B, each expansion unit can have the same clock signal for both the upstream and downstream directions. For the representative chain of seven expansion units, the total round trip delay for the downstream and upstream data pass is 14 clock cycles of the 35.328 MHz clock. When an expansion unit in the chain sends data upstream, it delays inserted data by the number of clock cycles necessary to match the timing pattern of the upstream data. For example, the fourth expansion unit in a chain of seven expansion units delays the newly inserted data by six clock cycles to match the timing of the upstream data at that expansion unit.

Figure 3:
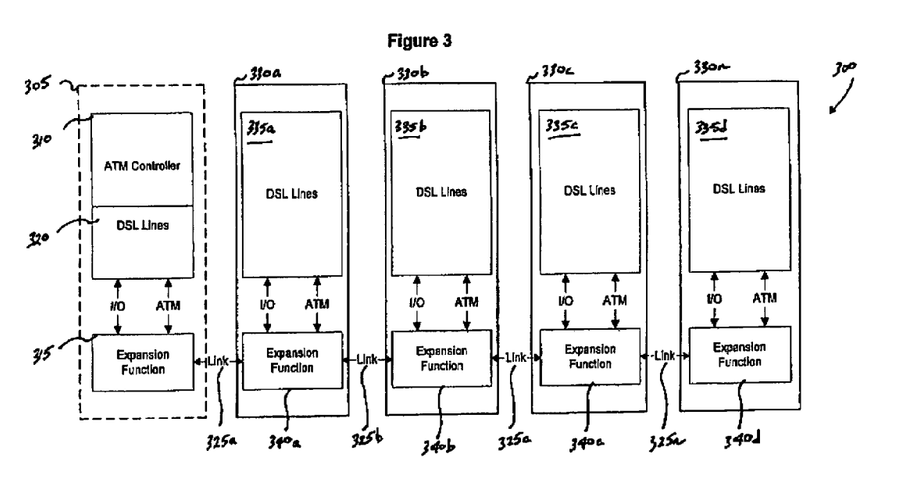
FIG. 3 is a block diagram illustrating the modular architecture of an exemplary embodiment of the present invention.

FIG. 3 is a block diagram illustrating the distributed nature of the master unit and linked expansion units for a representative DSLAM application in accordance with an exemplary embodiment of the present invention. For this exemplary embodiment, the operating environment is represented by a field cabinet 300 for a DLC system. The field cabinet 300, also described as a console, contains a master unit 305 and multiple expansion units 330a–330n. The master unit 305 and each expansion unit 330 are housed in separate, small form factor housings. Communications between the master unit 305 and each expansion unit 330 are carried by an expansion link 325. A chain of expansion units 330 can be constructed by connecting each pair of expansion units with an expansion link 325.

The logical functions of the master unit 305 comprise an ATM controller 310 and a fixed number of DSL interfaces 320. The master unit 305 further comprises a logical expansion function 315 having an expansion port that can be connected to an expansion link 325a. Although the ATM controller and DSL interfaces are illustrated as separate functional entities, it will be appreciated that a single circuit board typically contains both functions for the master unit 305. The expansion function 315 also can be placed on the same circuit board for convenient housing of all logical functions of the master unit 305 on a single printed circuit board. I/O and ATM signals are exchanged between the ATM controller 310, the local DSL interfaces 320 and the expansion function 315.

The expansion function 315 of the master unit 305 can accept ATM data from the ATM controller 310 and distribute that ATM data to the local DSL interfaces 320 and to the expansion units 330a–330n (via the expansion link(s) 325). In addition, the expansion function 315 can accept ATM data from the local DSL interfaces 320 and the expansion units 330a–330n (via the expansion link(s) 325) and distribute this combined ATM information to the ATM controller 310. The expansion function 315 also supports clock distribution, chip select, and buffering functions. The logical components of a representative expansion function, such as the expansion function 315, are described below in connection with FIG. 5.

The master unit 305 typically comprises a fixed number of local DSL interfaces, typically four DSL lines. In the event that subscribers for DSL services require access to more than the fixed number of available DSL lines provided by the master unit 305, the service provider can connect one or more expansion units 330 to the master unit 305 via expansion link(s) 325. Each expansion unit 330 can provide an additional number of DSL interfaces to expand the delivery of DSL services to the subscribers serviced by the DLC system. An expansion link 325 can be connected between either a pair of expansion units 330 or between a master unit 305 and an expansion unit 330.

Each expansion unit 330 comprises the logical functions of DSL interfaces 335 and an expansion function 340. I/O and ATM signals are exchanged between the DSL interfaces 335 and the expansion function 340. In addition, the expansion function 340 comprises both an input expansion port and an output expansion port capable of connection to an expansion link 325. The expansion function 340 completes operations that are similar to those of the expansion function 315 of the master unit 305. The logical components of a representative expansion function, such as the expansion function 340, are described below in connection with FIG. 5.

Figure 4:
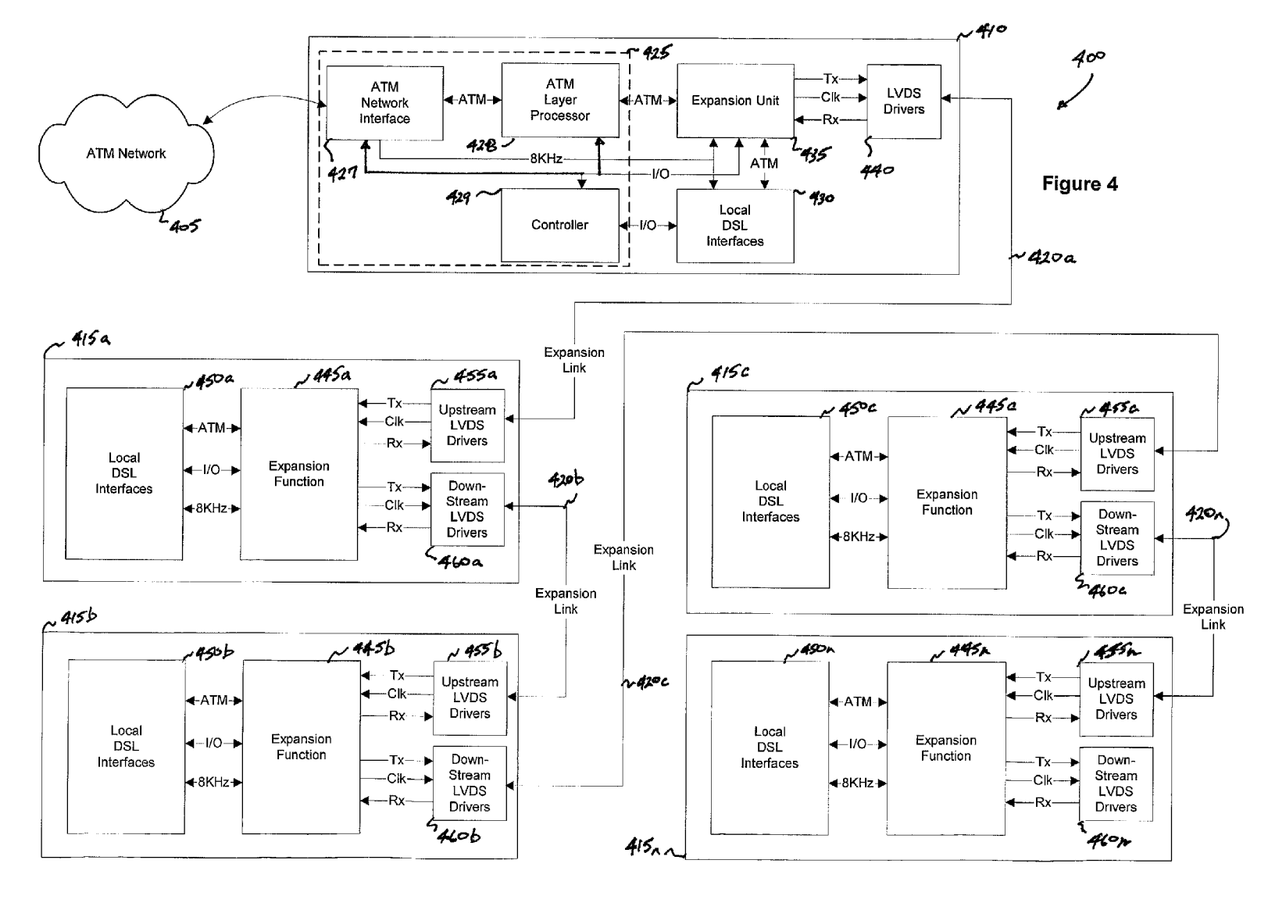
FIG. 4 is a block diagram illustrating the primary components of a master unit and linked expansion units in accordance with an exemplary embodiment of the present invention.

FIG. 4 is a block diagram presenting a detailed view of the logical functions supported by a master unit and linked expansion units for an exemplary embodiment of the present invention. Turning now to FIG. 4, an exemplary DSLAM 400 comprises a master unit 410, coupled to an ATM network 405, and expansion units 415a–415n, each coupled directly or indirectly to the master unit 410 via an expansion link 420a–420n. The ATM network 405 transports ATM cells between the master unit 410 and a network service provider connected to the ATM network 405. The interface to the ATM network 405 is provided by the ATM controller 425, which comprises an ATM network interface 427, an ATM layer processor 428, and controller 429. The ATM network interface 427 can transport ATM cells between the ATM network 405 and the ATM layer processor 428. The controller 429 initializes and manages the operations of the functional components of the master unit 410 and is responsive to communications with an element management system (EMS).

The ATM layer processor 428 determines which ATM cells should be delivered to available DSL ports, either DSL ports supported by the master unit 410 or an expansion unit 415a–415n. In addition, the ATM layer processor 428 can manage the priority of ATM cell transport based upon a priority assigned to individual cells. The ATM layer processor 428 also can combine cell traffic received from the local DSL ports of the master unit 410 or remote DSL ports of an expansion unit 415 for delivery to the ATM network 405. The ATM layer processor 428 also manages the quality of service (QoS) for the transport of ATM cells by the exemplary DSLAM 400. In view of the foregoing, it will be appreciated that the ATM layer processor 428 generally provides a routing function to route cells between a network service provider coupled to the ATM network 405 and DSL ports allocated to certain subscribers serviced by the exemplary DSLAM 400.

The master unit 410 further comprises local DSL interfaces 430 providing a fixed number of DSL ports, an expansion function 435, and LVDS drivers 440. I/O and ATM signals can be exchanged between the local DSL interfaces 430 and the expansion function 435. Transmit, clock, and receive signals can be communicated between the expansion function 435 and the LVDS drivers 440. The expansion function 435 also exchanges ATM signals with the ATM layer processor 428 and accepts an 8 KHz reference clock signal output by the ATM network interface 427. The controller 429 exchanges I/O signals with the local DSL interfaces 430 and the expansion function 435. The controller 429 also exchanges I/O signals with the ATM network interface 427 and the ATM layer processor 428 in connection with initialization and management functions provided by the controller.

The local DSL interfaces 430 and the expansion unit 435 provide functions similar to those described with the expansion function 315 and the local DSL interfaces 320 illustrated in FIG. 3. The expansion port of the master unit 410 is supported by the LVDS drivers 440, which can output a transmit signal (downstream data) and a clock signal provided by the expansion function 435 and can accept a receive signal (upstream data) for delivery to the expansion function 435. The LVDS drivers 440 provide the necessary electrical interface to the expansion link 420a, which is implemented by a flexible cable carrying serial interface LVDS signals. Each expansion link 420a–420n is preferably implemented by a CAT-5 flexible cable supporting the transportation of LVDS signals.

Although FIG. 4 illustrates multiple expansion units 415a–415n (and corresponding expansion links 420a–420n), it will be understood that each expansion unit 415 provides the modular expansion function of provisioning additional DSL ports to subscribers serviced by the DLC system. Because the master unit 410 provides a fixed number of DSL ports at the DSL interfaces 430, the expansion function offered by an expansion unit 415 is utilized by a LEC if the number of subscribers demanding DSL services exceeds the number of local DSL ports provided by the master unit 410. For this modulation component architecture, the ATM interface and control operations are provided by the master unit 410, whereas each expansion unit 415 provides additional DSL interfaces to supplement a fixed number of local ports provided by the master unit.

Turning now to a discussion of a representative example of an expansion unit, the expansion unit 415a is coupled to the master unit 410 via an expansion link 420a and to a downstream expansion unit 415b via the expansion link 420b. The expansion unit 415a comprises an expansion function 445a, DSL interfaces 450a, and LVDS drivers 455a and 460a. The LVDS driver 455a is positioned on the upstream side of the expansion unit 415a and communicates directly with the master unit 410 via the expansion link 420a. In contrast, the LVDS driver 460a is positioned on the downstream side of the expansion unit 415a and is coupled directly to the downstream expansion unit 415b via the expansion link 420b.

The expansion function 445a exchanges ATM cells, I/O and an 8 KHz reference clock signal with the DSL interfaces 450a. In addition, the expansion function 445a accepts transmit and clock signals from the upstream LVDS drivers 455a and outputs a receive signal to the upstream LVDS drivers 455a. For the downstream side, the expansion function 445a outputs transmit and clock signals to the downstream LVDS drivers 460a and accepts receive signals from the downstream LVDS drivers 460a. With the exception that the expansion function 445a services both input and output expansion ports of the expansion unit 415a, the logical functions of the expansion function 445a are similar to those functions found in the expansion function 435 of the master unit 410. Because the functions of the expansion unit 415a are duplicated in the remaining expansion units 415b–415n, a further discussion of these additional expansion units need not be provided in connection with FIG. 4.

Figure 5:
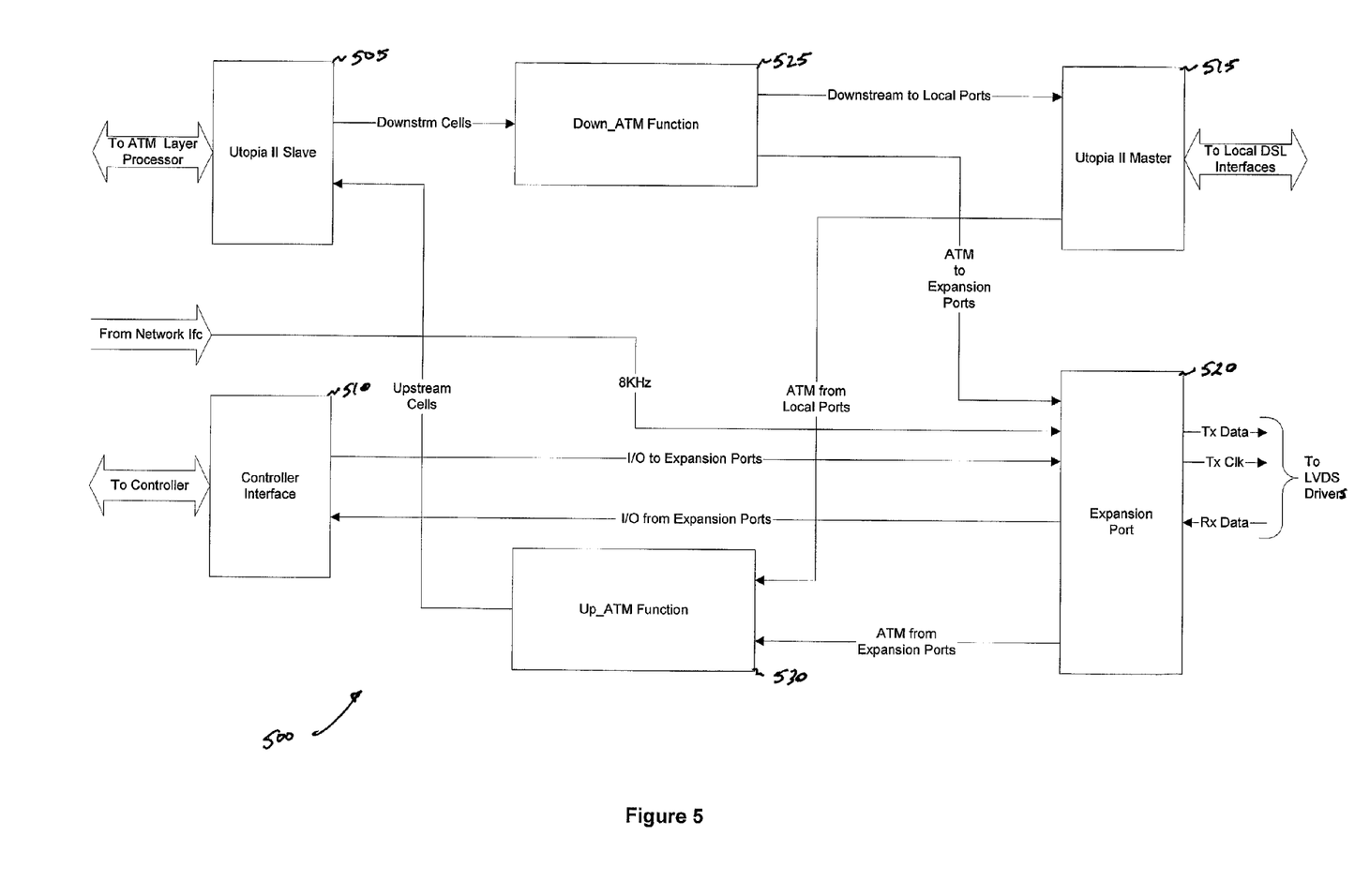
FIG. 5 is a block diagram illustrating the primary components of a field programmable gate array supporting the expansion function of an exemplary embodiment of a present invention.

FIG. 5 is a block diagram illustrating the logical components of an expansion function implemented by a field programmable gate array (FPGA) in accordance with an exemplary embodiment of the present invention. Turning now to FIG. 5, an expansion function 500 comprises the logical functions of a Utopia II slave 505, a CPU interface 510, a Utopia II master 515, and an expansion port 520. A Down-ATM function 525 is coupled between the Utopia II slave 505 and the Utopia II master 515 and the expansion port 520. An Up-ATM function is coupled between the Utopia II slave 505 and the Utopia II master 515 and the expansion port 520. The components illustrated in FIG. 5 are logical functions preferable implemented within a FPGA to implement the expansion function found within a master unit and each of the expansion units.

The Utopia II slave 505 communicates ATM signals with the ATM layer processor (FIG. 4) via a bi-directional bus. The Utopia II slave 505 transfers downstream ATM cells to the Down-ATM function 525 in response to receiving ATM cells from the ATM layer processor. This transfer of the downstream ATM cells between the Utopia II slave 505 and the Down-ATM function 525 can be accomplished by the use of a dual port random access memory (RAM). For example, the Utopia II slave 505 can place the downstream ATM cells into the dual port RAM and set a flag to advise the Down-ATM function 525 that ATM cells are available for access in the dual-port memory. The Down-ATM function 525 recognizes the set flag and accesses the dual-port memory to retrieve the downstream ATM cells.

The Down-ATM function 525 accepts the downstream ATM cells and, based upon priority and destination, sorts the cells and directs them to the Utopia II master 515 for transfer to the local DSL interfaces or to the expansion port 520 for distribution to an expansion unit. The Down-ATM function 525 comprises the logic required to complete the sorting and routing of downstream cells based upon the priority and destination assigned to these cells. The transfer of the downstream ATM cells to either the Utopia II master 515 or to the expansion port 520 can be accomplished by a data transfer using a dual-port RAM.

In response to receiving downstream ATM cells, the Utopia II master 515 converts the cells to a Utopia II bus format and routes the converted cells to the appropriate local DSL interface via a bi-directional bus. The Utopia II master 515 also can scan the local DSL interfaces to determine if an ATM cell is available for retrieval from the local DSL interfaces. If one or more cells are available at the local DSL interfaces, the Utopia II master 515 retrieves the cells for transfer to the Up-ATM function 530. This transfer of cells retrieved from the local DSL interfaces can be achieved by the use of a dual port RAM accessible by both the Utopia II master 515 and the Up-ATM function 530.

The Up-ATM 530 can accept cells from the Utopia II master 515 and from the expansion port 520. The Up-ATM function 530 collects the ATM cells and routes the cells as upstream ATM data to the Utopia II slave 505 for distribution to the ATM layer processor (FIG. 4). The ATM cells supplied by the expansion port 520 represents ATM cells retrieved from the DSL interfaces of the expansion unit(s) located downstream of the expansion function 500.

The CPU interface 510 accepts I/O from the expansion port 520 and outputs I/O to the expansion port. A bi-directional I/O bus is coupled between the CPU interface 510 and the controller of the ATM controller (FIG. 4). The CPU interface 520 comprises registers that can be accessed by the controller to read and write I/O data. The controller can write I/O data to a register in the CPU interface 510 for delivery to a remote expansion unit. In turn, the expansion port 520 can retrieve the I/O data designated for delivery to a remote unit and forward that I/O data in the downstream direction via an expansion link. The CPU interface 510 also can accept I/O from a remote expansion unit via the expansion port 520. Specifically, the expansion port 520 can retrieve the I/O data from the remote expansion unit and place that data within a register of the CPU interface 510. The expansion port 520 also sets a flag to advise the controller that remote I/O data is available for access by the controller in the CPU interface 510. In response to the set flag, the controller can read the register in the CPU interface 520 to obtain the remote I/O data. Similarly, I/O data designated for delivery to a remote expansion unit is stored within a register of the CPU interface 510 by the controller. In turn, the expansion port 520 can access that register to read the I/O data for transfer to the remote expansion unit via an expansion link.

The expansion port 520 can accept ATM cells from the Down-ATM function 525 and I/O data from the CPU interface 510. The expansion port 520 also accepts an 8 KHz reference clock signal provided by the ATM network interface. The expansion port 520 also can send I/O data to the CPU interface 510 and ATM cells to the Up-ATM function 530. In connection with the operation of an expansion link, the expansion port 520 can output transmit data and a clock signal to the expansion link via the LVDS drivers and can accept receive data from the expansion link via the LVDS drivers.

The expansion port 520 can collect I/O data and ATM cells, pack the collected information within an expansion frame, and forward that expansion frame as transmit data in the downstream direction to the expansion unit(s). In the upstream direction, the expansion port 520 monitors the received data for an expansion frame marker. If the expansion port 520 locates the expansion frame marker, the expansion port extracts the I/O and ATM cells from the expansion frame and distributes the extracted information to the CPU interface 510 and to the Up-ATM function 530, respectively.

For an exemplary embodiment of the present invention, the framing pattern for communications transported by the expansion link is defined in Table I.

TABLE I

Expansion Unit Framing Pattern

| Field | Length |
|---|---|
| Sync Word | 14 bits |
| Port Increment | 4 bits |
| 8 KHz Reference Clock | 1 bit |
| Read/Write/NOP | 3 bits |
| Address | 19 bits |
| Downstream Utopia II Map | 7 × 32 bits |
| 8 KHz reference | 1 bit |
| Upstream Utopia II Map | 7 × 32 bits |
| Processor Data | 8 bits |
| 8 KHz Reference Clock | 1 bit |
| ATM Cell ($1^{st}$ part) | 28 × 8 bits |
| 8 KHz Reference Clock | 1 bit |
| ATM Cell ($2^{nd}$ part) | 24 × 8 bits |

Turning now to Table I, the Sync Word field comprises a synchronization pattern to enable each expansion unit to recognize data in either the upstream or downstream paths as an expansion frame. The Sync Word is preferably the same pattern used in a conventional HDSL frame (11111100001100).

The Port Increment field comprises a 4-bit number that allows each expansion unit in an expansion chain to determine its position in that chain. The master unit sends all zeros in this field and each expansion unit increments the field. Based on a predetermined maximum length of seven expansion units in an exemplary chain, no expansion unit increments the Port Increment field beyond 0111. The expansion unit that increments the Port Increment field to 0111 loops back the downstream data in the upstream direction, regardless of whether there is another expansion unit positioned downstream. This allows the first seven expansion units to continue to operate even if someone adds an expansion unit beyond the maximum number. By examining the value of the Port Increment field received in the upstream path, the master unit can determine the number of expansion units within an expansion chain.

The 8 KHz Reference Clock field comprises a bit that rises and falls at an 8 KHz rate. This reference is derived from the T1 data that is supplied to the master unit and is ultimately timed by the ATM network. To reduce the phase jitter of this timing signal, the frame pattern comprises four separate slots for the 8 KHz Reference Clock. The 8 KHz Reference Clock signal is also supplied to the transceivers of the DSL interfaces of the master unit and each expansion unit as a timing reference.

The Read/Write/NOP field comprises a 3-bit flag that supports a determination of whether the controller is completing an I/O operation on the I/O bus of an expansion unit. If the 3-bid flag is set to 000, the controller is not completing an I/O operation. If the flag is set to 010, the controller is completing a single write cycle. If the flag is set to 001, the controller is completing a read cycle. If the flag is set to 110, the controller is completing a 32-byte block write cycle. If the flag is set to 101, the controller is completing a block read cycle.

The Address field preferably comprises five address segments.

The first address segment comprises a "global" bit. If this segment is set, the current write cycle pertains to all of the expansion units in the chain. If clear, the current write cycle pertains to a single unit.

The next address segment comprises a "continental" bit. If this segment is set, the current write cycle pertains to all of the ports in the selected expansion unit. If this segment is clear, the current write cycle pertains only to the selected port.

The third address segment comprises a 3-bit unit address. This runs from 0 to 6 and matches the Port Increment field output by the upstream expansion unit. This address segment is ignored if the "global" bit is set for write cycles.

The fourth address segment comprises five port address bits. An exemplary protocol supports up to sixteen ports per expansion unit, plus another "port" for interface items, such as LEDs, etc. This segment is ignored if the "continental" bit is set for write cycles.

The fifth address segment comprises nine address bits. This is the address within each port that the I/O is intended for delivery.

The Downstream Utopia II Map comprises seven long words (32 bits each). There is one long word for each expansion unit in an exemplary chain comprising the maximum number of seven expansion units. The first long word contains an indication that the current frame contains a cell for an expansion port. Address fields select the destination unit and port. Each expansion unit replaces its long word with a different one. In the long word output to the master unit, each bit also represents a given Utopia Address. If a given bit is set, this means that the corresponding Utopia Address can accept a cell.

The Upstream Utopia II Map comprises seven long words (32 bits each). The first long word contains a command for an expansion unit to place a cell into the current frame. Address fields select the source unit and port. The appropriate expansion unit can replace the Upstream Utopia II Map with a bit field representing the Utopia addresses with cells to send. That is, if a given bit is set in the long word belonging to a given expansion unit, there is a cell waiting at the corresponding Utopia address to be sent to the master unit.

The Processor Data field comprises data to be written to a location in an expansion unit or that has been read from a location in an expansion unit. Because the Utopia II Map fields are sent between the Read/Write/Addressing fields and this field, there is sufficient time to read a byte from the selected address and place it into this field.

The last field in this exemplary frame pattern is the ATM Cell field. There is room in this field for 4 header bytes and 48 payload bytes. If the controller is performing a block read or write, the first 32 bytes of this field are written to 32 locations beginning with the address in the Address field above. The writes can be global as selected by the global/continental bits in the Address field. It is up to the master unit to ensure that there is no collision between ATM traffic and I/O traffic.

Representative performance statistics for an exemplary embodiment using the frame pattern defined in Table I include:

| | |
|---|---|
| Frame size | 916 Bits/frame |
| Frame Rate: | 38,568 Frames/sec |
| Cell Bandwidth: | 16.04 MBit/sec |
| Block Bandwidth under no load: | 1.23 MBytes/sec |
| Block Bandwidth under full load: | 770 KBytes/sec |

Table II provides a bit-level definition for the exemplary framing pattern for both transmit and receive signals. The transmit and receive directions are based on the viewpoint of the master unit. In other words, the transmit signal definition defines the framing pattern that is transmitted by the master unit, and the receive signal definition defines the framing pattern that is received by the master unit. Consequently, the transmit signal is output by the master unit in the downstream direction, whereas the master unit receives the receive signal in the upstream direction.

TABLE II

| Bit | Transmit Definition | Receive Definition |
|---|---|---|
| 0 | 1 - Frame | |
| 1 | 1 - Frame | |
| 2 | 1 - Frame | |
| 3 | 1 - Frame | |
| 4 | 1 - Frame | |
| 5 | 1 - Frame | |
| 6 | 0 - Frame | |
| 7 | 0 - Frame | |
| 8 | 0 - Frame | |
| 9 | 0 - Frame | |
| A | 1 - Frame | |
| B | 1 - Frame | |
| C | 0 - Frame | |
| D | 0 - Frame | |
| E | 0 | Number of expanders bit 3 |
| F | 0 | Number of expanders bit 2 |
| 10 | 0 | Number of expanders bit 1 |
| 11 | 0 | Number of expanders bit 0 |
| 12 | 8 KHz | |
| 13 | Block I/O Command | |
| 14 | Read Command | |

TABLE II-continued

| Bit | Transmit Definition | Receive Definition |
|---|---|---|
| 15 | Write Command | |
| 16 | Global Output | |
| 17 | Continental Output | |
| 18 | Unit I/O Address Bit 2 | |
| 19 | Unit I/O Address Bit 1 | |
| 1A | Unit I/O Address Bit 0 | |
| 1B | Port I/O Address Bit 4 | |
| 1C | Port I/O Address Bit 3 | |
| 1D | Port I/O Address Bit 2 | |
| 1E | Port I/O Address Bit 1 | |
| 1F | Port I/O Address Bit 0 | |
| 20 | Address 8 | |
| 21 | Address 7 | |
| 22 | Address 6 | |
| 23 | Address 5 | |
| 24 | Address 4 | |
| 25 | Address 3 | |
| 26 | Address 2 | |
| 27 | Address 1 | |
| 28 | Address 0 | |
| 29 | 0 | Unit 0 Port 31 ready for cell |
| 2A | 0 | Unit 0 Port 30 ready for cell |
| 2B | 0 | Unit 0 Port 29 ready for cell |
| 2C | 0 | Unit 0 Port 28 ready for cell |
| 2D | 0 | Unit 0 Port 27 ready for cell |
| 2E | 0 | Unit 0 Port 26 ready for cell |
| 2F | 0 | Unit 0 Port 25 ready for cell |
| 30 | 0 | Unit 0 Port 24 ready for cell |
| 31 | 0 | Unit 0 Port 23 ready for cell |
| 32 | 0 | Unit 0 Port 22 ready for cell |
| 33 | 0 | Unit 0 Port 21 ready for cell |
| 34 | 0 | Unit 0 Port 20 ready for cell |
| 35 | 0 | Unit 0 Port 19 ready for cell |
| 36 | 0 | Unit 0 Port 18 ready for cell |
| 37 | 0 | Unit 0 Port 17 ready for cell |
| 38 | 0 | Unit 0 Port 16 ready for cell |
| 39 | 0 | Unit 0 Port 15 ready for cell |
| 3A | 0 | Unit 0 Port 14 ready for cell |
| 3B | 0 | Unit 0 Port 13 ready for cell |
| 3C | 0 | Unit 0 Port 12 ready for cell |
| 3D | 0 | Unit 0 Port 11 ready for cell |
| 3E | 0 | Unit 0 Port 10 ready for cell |
| 3F | 0 | Unit 0 Port 9 ready for cell |
| 40 | 1 = This frame has a cell for port addressed below | Unit 0 Port 8 ready for cell |
| 41 | Unit cell is for - Bit 2 | Unit 0 Port 7 ready for cell |
| 42 | Unit cell is for - Bit 1 | Unit 0 Port 6 ready for cell |
| 43 | Unit cell is for - Bit 0 | Unit 0 Port 5 ready for cell |
| 44 | Port cell is for - Bit 4 | Unit 0 Port 4 ready for cell |
| 45 | Port cell is for - Bit 3 | Unit 0 Port 3 ready for cell |
| 46 | Port cell is for - Bit 2 | Unit 0 Port 2 ready for cell |
| 47 | Port cell is for - Bit 1 | Unit 0 Port 1 ready for cell |
| 48 | Port cell is for - Bit 0 | Unit 0 Port 0 ready for cell |
| 49–68 | 0 | Unit 1 ready for cell map |
| 67–88 | 0 | Unit 2 ready for cell map |
| 87–A8 | 0 | Unit 3 ready for cell map |
| A9–C8 | 0 | Unit 4 ready for cell map |
| C9–E8 | 0 | Unit 5 ready for cell map |
| E9–108 | 0 | Unit 6 ready for cell map |
| 109 | 8 KHz reference sample | |
| 10A | 0 | Unit 0 Port 31 has a cell |
| 10B | 0 | Unit 0 Port 30 has a cell |
| 10C | 0 | Unit 0 Port 29 has a cell |
| 10D | 0 | Unit 0 Port 28 has a cell |
| 10E | 0 | Unit 0 Port 27 has a cell |
| 10F | 0 | Unit 0 Port 26 has a cell |
| 110 | 0 | Unit 0 Port 25 has a cell |
| 111 | 0 | Unit 0 Port 24 has a cell |
| 112 | 0 | Unit 0 Port 23 has a cell |
| 113 | 0 | Unit 0 Port 22 has a cell |
| 114 | 0 | Unit 0 Port 21 has a cell |
| 115 | 0 | Unit 0 Port 20 has a cell |
| 116 | 0 | Unit 0 Port 19 has a cell |
| 117 | 0 | Unit 0 Port 18 has a cell |
| 118 | 0 | Unit 0 Port 17 has a cell |
| 119 | 0 | Unit 0 Port 16 has a cell |
| 11A | 0 | Unit 0 Port 15 has a cell |

TABLE II-continued

| Bit | Transmit Definition | Receive Definition |
|---|---|---|
| 11B | 0 | Unit 0 Port 14 has a cell |
| 11C | 0 | Unit 0 Port 13 has a cell |
| 11D | 0 | Unit 0 Port 12 has a cell |
| 11E | 0 | Unit 0 Port 11 has a cell |
| 11F | 0 | Unit 0 Port 10 has a cell |
| 120 | 0 | Unit 0 Port 9 has a cell |
| 121 | 1 = Put cell from unit/port addressed below in this frame | Unit 0 Port 8 has a cell |
| 122 | Unit to get cell from - Bit 2 | Unit 0 Port 7 has a cell |
| 123 | Unit to get cell from - Bit 1 | Unit 0 Port 6 has a cell |
| 124 | Unit to get cell from - Bit 0 | Unit 0 Port 5 has a cell |
| 125 | Port to get cell from - Bit 4 | Unit 0 Port 4 has a cell |
| 126 | Port to get cell from - Bit 3 | Unit 0 Port 3 has a cell |
| 127 | Port to get cell from - Bit 2 | Unit 0 Port 2 has a cell |
| 128 | Port to get cell from - Bit 1 | Unit 0 Port 1 has a cell |
| 129 | Port to get cell from - Bit 0 | Unit 0 Port 0 has a cell |
| 12A–149 | 0 | Unit 1 cell availability map |
| 14A–169 | 0 | Unit 2 cell availability map |
| 16A–189 | 0 | Unit 3 cell availability map |
| 18A–1A9 | 0 | Unit 4 cell availability map |
| 1AA–1C9 | 0 | Unit 5 cell availability map |
| 1CA–1E9 | 0 | Unit 6 cell availability map |
| 1EA | CPU Data Bit 7 | CPU Data Bit 7 |
| 1EB | CPU Data Bit 6 | CPU Data Bit 6 |
| 1EC | CPU Data Bit 5 | CPU Data Bit 5 |
| 1ED | CPU Data Bit 4 | CPU Data Bit 4 |
| 1EE | CPU Data Bit 3 | CPU Data Bit 3 |
| 1EF | CPU Data Bit 2 | CPU Data Bit 2 |
| 1F0 | CPU Data Bit 1 | CPU Data Bit 1 |
| 1F1 | CPU Data Bit 0 | CPU Data Bit 0 |
| 1F2 | 8 KHz reference sample | |
| 1F3–1FA | ATM Cell Header 1 | ATM Cell Header 1 |
| 1FB–202 | ATM Cell Header 2 | ATM Cell Header 2 |
| 203–20A | ATM Cell Header 3 | ATM Cell Header 3 |
| 20B–212 | ATM Cell Header 4 | ATM Cell Header 4 |
| 213–21A | ATM Cell Payload 1 | ATM Cell Payload 1 |
| 21B–222 | ATM Cell Payload 2 | ATM Cell Payload 2 |
| 223–22A | ATM Cell Payload 3 | ATM Cell Payload 3 |
| 22B–232 | ATM Cell Payload 4 | ATM Cell Payload 4 |
| 233–23A | ATM Cell Payload 5 | ATM Cell Payload 5 |
| 23B–242 | ATM Cell Payload 6 | ATM Cell Payload 6 |
| 243–24A | ATM Cell Payload 7 | ATM Cell Payload 7 |
| 24B–252 | ATM Cell Payload 8 | ATM Cell Payload 8 |
| 253–25A | ATM Cell Payload 9 | ATM Cell Payload 9 |
| 25B–262 | ATM Cell Payload 10 | ATM Cell Payload 10 |
| 263–26A | ATM Cell Payload 11 | ATM Cell Payload 11 |
| 26B–272 | ATM Cell Payload 12 | ATM Cell Payload 12 |
| 273–27A | ATM Cell Payload 13 | ATM Cell Payload 13 |
| 27B–282 | ATM Cell Payload 14 | ATM Cell Payload 14 |
| 283–28A | ATM Cell Payload 15 | ATM Cell Payload 15 |
| 28B–292 | ATM Cell Payload 16 | ATM Cell Payload 16 |
| 293–29A | ATM Cell Payload 17 | ATM Cell Payload 17 |
| 29B–2A2 | ATM Cell Payload 18 | ATM Cell Payload 18 |
| 2A3–2AA | ATM Cell Payload 19 | ATM Cell Payload 19 |
| 2AB–2B2 | ATM Cell Payload 20 | ATM Cell Payload 20 |
| 2B3–2BA | ATM Cell Payload 21 | ATM Cell Payload 21 |
| 2BB–2C2 | ATM Cell Payload 22 | ATM Cell Payload 22 |
| 2C3–2CA | ATM Cell Payload 23 | ATM Cell Payload 23 |
| 2CB–2D2 | ATM Cell Payload 24 | ATM Cell Payload 24 |
| 2D3 | 8 KHz reference | |
| 2D4–2DB | ATM Cell Payload 25 | ATM Cell Payload 25 |
| 2DC–2E3 | ATM Cell Payload 26 | ATM Cell Payload 26 |
| 2E4–2EB | ATM Cell Payload 27 | ATM Cell Payload 27 |
| 2EC–2F3 | ATM Cell Payload 28 | ATM Cell Payload 28 |
| 2F4–2FB | ATM Cell Payload 29 | ATM Cell Payload 29 |
| 2FC–303 | ATM Cell Payload 30 | ATM Cell Payload 30 |
| 304–30B | ATM Cell Payload 31 | ATM Cell Payload 31 |
| 30C–313 | ATM Cell Payload 32 | ATM Cell Payload 32 |
| 314–31B | ATM Cell Payload 33 | ATM Cell Payload 33 |
| 31C–323 | ATM Cell Payload 34 | ATM Cell Payload 34 |
| 324–32B | ATM Cell Payload 35 | ATM Cell Payload 35 |
| 32C–333 | ATM Cell Payload 36 | ATM Cell Payload 36 |
| 334–33B | ATM Cell Payload 37 | ATM Cell Payload 37 |
| 33C–343 | ATM Cell Payload 38 | ATM Cell Payload 38 |
| 344–34B | ATM Cell Payload 39 | ATM Cell Payload 39 |
| 34C–353 | ATM Cell Payload 40 | ATM Cell Payload 40 |
| 354–35B | ATM Cell Payload 41 | ATM Cell Payload 41 |
| 35C–363 | ATM Cell Payload 42 | ATM Cell Payload 42 |
| 364–36B | ATM Cell Payload 43 | ATM Cell Payload 43 |
| 36C–373 | ATM Cell Payload 44 | ATM Cell Payload 44 |
| 374–37B | ATM Cell Payload 45 | ATM Cell Payload 45 |
| 37C–383 | ATM Cell Payload 46 | ATM Cell Payload 46 |
| 384–38B | ATM Cell Payload 47 | ATM Cell Payload 47 |
| 38C–393 | ATM Cell Payload 48 | ATM Cell Payload 48 |

Table III illustrates a definition of fields for an expansion unit framing pattern for an alternative exemplary embodiment of the present invention. Table III is similar to Table I, with the exceptions that (1) the Downstream Utopia II Map is not used by the alternative exemplary embodiment and (2) the 8 KHz reference clock field separating the ATM cell fields is replaced by a cell reject field. These changes to the framing pattern support a high speed downstream data rate between the master unit and a chain of one or more expansion units.

TABLE III

Alternative Expansion Unit Framing Pattern

| | |
|---|---|
| Sync Word | 14 bits |
| Port Increment | 4 bits |
| 8 KHz reference | 1 bit |
| Read/Write/NOP | 3 bits |
| Address | 19 bits |
| Downstream Utopia Map | 7 × 32 bits (not used) |
| 8 KHz reference | 1 bit |
| Upstream Utopia Map | 7 × 32 bits |
| Processor Data | 8 bits |
| 8 KHz reference | 1 bit |
| ATM Cell (1$^{st}$ part) | 28 × 8 bits |
| Cell Reject | 1 bit |
| ATM Cell (2$^{nd}$ part) | 24 × 8 bits |

For the alternative expansion unit framing pattern, the format for the Downstream Utopia Map is changed from the format shown in Table I. The first word (16 bits) send by the master unit contains a command to a selected expansion unit to place an ATM cell from the selected port into this frame. The second word contains a command to place an ATM cell contained within this frame into the selected port. The expansion units will not place anything in this map field and the field will be ignored by the master unit.

In addition, rather than place an 8 KHz reference clock signal in the middle of the ATM cell, the addressed expansion unit replaces this bit in the upstream direction with a cell rejected indication. If the bit is set to a one, the addressed port was not able to accept a cell and the master unit should resend it later. If the bit is clear, the addressed port was able to accept the cell and the master unit treats the communication as completed.

The remaining fields in the alternative expansion unit framing pattern defined by Table III are identical to the corresponding fields for the exemplary expansion unit framing pattern defined in Table I.

For the alternative framing pattern, an ATM cell can always be sent to a transceiver with the opportunity to receive feedback that the transceiver did indeed accept the cell. This supports a high speed downstream data rate because ATM cells can be sent to a transceiver as fast as that component is able to accept such cells. In contrast, the feedback mechanism of the first-described framing pattern may limit the rate at which ATM cells can be sent to the transceiver because the feedback comprises whether the transceiver can accept the cell.

Representative performance statistics for the alternative expansion unit framing pattern include:

| | |
|---|---|
| Frame size | 916 Bits/frame |
| Frame Rate: | 38,568 Frames/sec |
| Cell Bandwidth: | 16.04 MBit/sec |
| Block Bandwidth under no load: | 1.23 MBytes/sec |
| Block Bandwidth under full load: | 770 KBytes/sec |

Table IV provides a bit-level definition of the transmit and receive signals for the alternative framing pattern. Using the master unit as the base, the transmit signal is transported in the downstream direction, whereas the receive signal is transported in the upstream direction.

TABLE IV

| Bit | Transmit Definition | Receive Definition |
|---|---|---|
| 0 | 1 - Frame | |
| 1 | 1 - Frame | |
| 2 | 1 - Frame | |
| 3 | 1 - Frame | |
| 4 | 1 - Frame | |
| 5 | 1 - Frame | |
| 6 | 0 - Frame | |
| 7 | 0 - Frame | |
| 8 | 0 - Frame | |
| 9 | 0 - Frame | |
| A | 1 - Frame | |
| B | 1 - Frame | |
| C | 0 - Frame | |
| D | 0 - Frame | |
| E | 0 | Number of expanders bit 3 |
| F | 0 | Number of expanders bit 2 |
| 10 | 0 | Number of expanders bit 1 |
| 11 | 0 | Number of expanders bit 0 |
| 12 | 8 KHz | |
| 13 | Block I/O Command | |
| 14 | Read Command | |
| 15 | Write Command | |
| 16 | Global Output | |
| 17 | Continental Output | |
| 18 | Unit I/O Address Bit 2 | |
| 19 | Unit I/O Address Bit 1 | |
| 1A | Unit I/O Address Bit 0 | |
| 1B | Port I/O Address Bit 4 | |
| 1C | Port I/O Address Bit 3 | |
| 1D | Port I/O Address Bit 2 | |
| 1E | Port I/O Address Bit 1 | |
| 1F | Port I/O Address Bit 0 | |
| 20 | Address 8 | |
| 21 | Address 7 | |
| 22 | Address 6 | |
| 23 | Address 5 | |
| 24 | Address 4 | |
| 25 | Address 3 | |
| 26 | Address 2 | |
| 27 | Address 1 | |
| 28 | Address 0 | |
| 29 | 0 | |
| 2A | 0 | |
| 2B | 0 | |
| 2C | 0 | |
| 2D | 0 | |
| 2E | 0 | |
| 2F | 0 | |
| 30 | 1 = Put cell from unit/port addressed below in this frame | |
| 31 | Unit to get cell from - Bit 2 | |
| 32 | Unit to get cell from - Bit 1 | |
| 33 | Unit to get cell from - Bit 0 | |
| 34 | Port to get cell from - Bit 4 | |
| 35 | Port to get cell from - Bit 3 | |
| 36 | Port to get cell from - Bit 2 | |
| 37 | Port to get cell from - Bit 1 | |
| 38 | Port to get cell from - Bit 0 | |
| 39 | 0 | |
| 3A | 0 | |
| 3B | 0 | |
| 3C | 0 | |
| 3D | 0 | |
| 3E | 0 | |
| 3F | 0 | |
| 40 | 1 = This frame has a cell for port addressed below | |
| 41 | Unit cell is for - Bit 2 | |
| 42 | Unit cell is for - Bit 1 | |
| 43 | Unit cell is for - Bit 0 | |
| 44 | Port cell is for - Bit 4 | |
| 45 | Port cell is for - Bit 3 | |
| 46 | Port cell is for - Bit 2 | |
| 47 | Port cell is for - Bit 1 | |
| 48 | Port cell is for - Bit 0 | |
| 49–68 | 0 . . . 0 | |
| 67–88 | 0 . . . 0 | |
| 87–A8 | 0 . . . 0 | |
| A9–C8 | 0 . . . 0 | |
| C9–E8 | 0 . . . 0 | |
| E9–108 | 0 . . . 0 | |
| 109 | 8 KHz reference sample | |
| 10A | 0 | Unit 0 Port 31 has a cell |
| 10B | 0 | Unit 0 Port 30 has a cell |
| 10C | 0 | Unit 0 Port 29 has a cell |
| 10D | 0 | Unit 0 Port 28 has a cell |
| 10E | 0 | Unit 0 Port 27 has a cell |
| 10F | 0 | Unit 0 Port 26 has a cell |
| 110 | 0 | Unit 0 Port 25 has a cell |
| 111 | 0 | Unit 0 Port 24 has a cell |
| 112 | 0 | Unit 0 Port 23 has a cell |
| 113 | 0 | Unit 0 Port 22 has a cell |
| 114 | 0 | Unit 0 Port 21 has a cell |
| 115 | 0 | Unit 0 Port 20 has a cell |
| 116 | 0 | Unit 0 Port 19 has a cell |
| 117 | 0 | Unit 0 Port 18 has a cell |
| 118 | 0 | Unit 0 Port 17 has a cell |
| 119 | 0 | Unit 0 Port 16 has a cell |
| 11A | 0 | Unit 0 Port 15 has a cell |
| 11B | 0 | Unit 0 Port 14 has a cell |
| 11C | 0 | Unit 0 Port 13 has a cell |
| 11D | 0 | Unit 0 Port 12 has a cell |
| 11E | 0 | Unit 0 Port 11 has a cell |
| 11F | 0 | Unit 0 Port 10 has a cell |
| 120 | 0 | Unit 0 Port 9 has a cell |
| 121 | 0 | Unit 0 Port 8 has a cell |
| 122 | 0 | Unit 0 Port 7 has a cell |
| 123 | 0 | Unit 0 Port 6 has a cell |
| 124 | 0 | Unit 0 Port 5 has a cell |
| 125 | 0 | Unit 0 Port 4 has a cell |
| 126 | 0 | Unit 0 Port 3 has a cell |
| 127 | 0 | Unit 0 Port 2 has a cell |
| 128 | 0 | Unit 0 Port 1 has a cell |
| 129 | 0 | Unit 0 Port 0 has a cell |
| 12A–149 | 0 . . . 0 | Unit 1 cell availability map |
| 14A–169 | 0 . . . 0 | Unit 2 cell availability map |
| 16A–189 | 0 . . . 0 | Unit 3 cell availability map |
| 18A–1A9 | 0 . . . 0 | Unit 4 cell availability map |
| 1AA–1C9 | 0 . . . 0 | Unit 5 cell availability map |
| 1CA–1E9 | 0 . . . 0 | Unit 6 cell availability map |
| 1EA | CPU Data Bit 7 | CPU Data Bit 7 |
| 1EB | CPU Data Bit 6 | CPU Data Bit 6 |
| 1EC | CPU Data Bit 5 | CPU Data Bit 5 |
| 1ED | CPU Data Bit 4 | CPU Data Bit 4 |
| 1EE | CPU Data Bit 3 | CPU Data Bit 3 |
| 1EF | CPU Data Bit 2 | CPU Data Bit 2 |
| 1F0 | CPU Data Bit 1 | CPU Data Bit 1 |
| 1F1 | CPU Data Bit 0 | CPU Data Bit 0 |
| 1F2 | 8 KHz reference sample | |
| 1F3–1FA | ATM Cell Header 1 | ATM Cell Header 1 |
| 1FB–202 | ATM Cell Header 2 | ATM Cell Header 2 |

TABLE IV-continued

| Bit | Transmit Definition | Receive Definition |
| --- | --- | --- |
| 203–20A | ATM Cell Header 3 | ATM Cell Header 3 |
| 20B–212 | ATM Cell Header 4 | ATM Cell Header 4 |
| 213–21A | ATM Cell Payload 1 | ATM Cell Payload 1 |
| 21B–222 | ATM Cell Payload 2 | ATM Cell Payload 2 |
| 223–22A | ATM Cell Payload 3 | ATM Cell Payload 3 |
| 22B–232 | ATM Cell Payload 4 | ATM Cell Payload 4 |
| 233–23A | ATM Cell Payload 5 | ATM Cell Payload 5 |
| 23B–242 | ATM Cell Payload 6 | ATM Cell Payload 6 |
| 243–24A | ATM Cell Payload 7 | ATM Cell Payload 7 |
| 24B–252 | ATM Cell Payload 8 | ATM Cell Payload 8 |
| 253–25A | ATM Cell Payload 9 | ATM Cell Payload 9 |
| 25B–262 | ATM Cell Payload 10 | ATM Cell Payload 10 |
| 263–26A | ATM Cell Payload 11 | ATM Cell Payload 11 |
| 26B–272 | ATM Cell Payload 12 | ATM Cell Payload 12 |
| 273–27A | ATM Cell Payload 13 | ATM Cell Payload 13 |
| 27B–282 | ATM Cell Payload 14 | ATM Cell Payload 14 |
| 283–28A | ATM Cell Payload 15 | ATM Cell Payload 15 |
| 28B–292 | ATM Cell Payload 16 | ATM Cell Payload 16 |
| 293–29A | ATM Cell Payload 17 | ATM Cell Payload 17 |
| 29B–2A2 | ATM Cell Payload 18 | ATM Cell Payload 18 |
| 2A3–2AA | ATM Cell Payload 19 | ATM Cell Payload 19 |
| 2AB–2B2 | ATM Cell Payload 20 | ATM Cell Payload 20 |
| 2B3–2BA | ATM Cell Payload 21 | ATM Cell Payload 21 |
| 2BB–2C2 | ATM Cell Payload 22 | ATM Cell Payload 22 |
| 2C3–2CA | ATM Cell Payload 23 | ATM Cell Payload 23 |
| 2CB–2D2 | ATM Cell Payload 24 | ATM Cell Payload 24 |
| 2D3 | 8 KHz reference | 1 - Cell Rejected by Xcvr |
| | | 0 - Cell Accepted by Xcvr |
| 2D4–2DB | ATM Cell Payload 25 | ATM Cell Payload 25 |
| 2DC–2E3 | ATM Cell Payload 26 | ATM Cell Payload 26 |
| 2E4–2EB | ATM Cell Payload 27 | ATM Cell Payload 27 |
| 2EC–2F3 | ATM Cell Payload 28 | ATM Cell Payload 28 |
| 2F4–2FB | ATM Cell Payload 29 | ATM Cell Payload 29 |
| 2FC–303 | ATM Cell Payload 30 | ATM Cell Payload 30 |
| 304–30B | ATM Cell Payload 31 | ATM Cell Payload 31 |
| 30C–313 | ATM Cell Payload 32 | ATM Cell Payload 32 |
| 314–31B | ATM Cell Payload 33 | ATM Cell Payload 33 |
| 31C–323 | ATM Cell Payload 34 | ATM Cell Payload 34 |
| 324–32B | ATM Cell Payload 35 | ATM Cell Payload 35 |
| 32C–333 | ATM Cell Payload 36 | ATM Cell Payload 36 |
| 334–33B | ATM Cell Payload 37 | ATM Cell Payload 37 |
| 33C–343 | ATM Cell Payload 38 | ATM Cell Payload 38 |
| 344–34B | ATM Cell Payload 39 | ATM Cell Payload 39 |
| 34C–353 | ATM Cell Payload 40 | ATM Cell Payload 40 |
| 354–35B | ATM Cell Payload 41 | ATM Cell Payload 41 |
| 35C–363 | ATM Cell Payload 42 | ATM Cell Payload 42 |
| 364–36B | ATM Cell Payload 43 | ATM Cell Payload 43 |
| 36C–373 | ATM Cell Payload 44 | ATM Cell Payload 44 |
| 374–37B | ATM Cell Payload 45 | ATM Cell Payload 45 |
| 37C–383 | ATM Cell Payload 46 | ATM Cell Payload 46 |
| 384–38B | ATM Cell Payload 47 | ATM Cell Payload 47 |
| 38C–393 | ATM Cell Payload 48 | ATM Cell Payload 48 |

In view of the foregoing, those skilled in the art will appreciate that the present invention supports the expansion of ATM-compatible ports, such as DSL ports, by linking a master unit comprising a fixed number of ATM-compatible ports with one or more expansion units comprising supplemental ATM-compatible ports. A flexible expansion link, typically a serial interface cable, can be connected between a pair of expansion units to form a chain of expansion units. The master unit can be connected to the chain of expansion units via another flexible expansion link. This combination of a master unit and one or more linked expansion units provides a scaleable deployment solution for the provisioning of ATM-compatible services to subscribers serviced by a service provider. The master unit and each expansion unit are housed in separate small form-factor housings for convenient placement within a field cabinet of a DLC system. Significantly, the size of a master unit and each expansion unit is much less than a conventional rack unit typically installed within a DLC field cabinet.

Having described in detail the exemplary embodiments of the present invention, it is to be understood that the construction and operation of the exemplary embodiments could be carried out with different elements and tasks. The exemplary embodiments are presented only by way of example and are not meant to limit the scope of the present invention, which is defined by the following claim set.

We claim:

1. A system for expanding the delivery of telecommunication services, comprising:
    a master unit, coupled to a wide area network (WAN) comprising an Asynchronous Transfer Mode (ATM)-compatible network, operable to process telecommunication service signals comprising ATM cells for communication with the WAN and with a fixed number of telecommunication service interfaces at the master unit, the master unit comprising:
        the fixed number of telecom service interfaces;
        a Plain Old Telephone Service (POTS) interface, coupled to a Digital Line Carrier (DLC) system, for exchanging POTS signals between the DLC system and the master unit;
        a controller for processing the ATM cells;
        a T1 interface, coupled to the ATM-compatible network, for exchanging the ATM cells between the ATM-compatible network and the controller;
        a plurality of local ATM-compatible interfaces for communicating the ATM cells and POTS signals to subscribers serviced by the master unit; and
        an expansion function, coupled to the controller, the ATM-compatible interfaces and an expansion port, for communicating the ATM cells in the upstream and the downstream directions via the expansion port and for communicating the ATM cells with the local ATM-compatible interfaces;
    an expansion unit, coupled via an expansion link to the master unit, comprising an expansion set of telecommunication service interfaces, the expansion unit operable to transmit telecommunication service signals in the upstream direction via the expansion link for processing by the master unit and to receive telecommunication service signals in the downstream direction from the master unit via the expansion link for delivery to the expansion set of telecommunication service interfaces.

2. The system of claim 1 further comprising a second expansion unit, coupled to the expansion unit via a second expansion link, the second expansion unit comprising a second expansion set of telecommunication service interfaces and operable to transmit telecommunication service signals in the upstream direction via a combination of the expansion unit and the pair of expansion links for processing by the master unit and to receive telecommunication service signals in the downstream direction from the master unit via a combination of the expansion unit and the pair of expansion links for delivery to the second expansion set of telecommunication service interfaces.

3. The system of claim 1, wherein the expansion link comprises a flexible cable supporting a serial communications interface.

4. The system of claim 1, wherein the expansion unit comprises:
    a plurality of remote ATM-compatible interfaces; and
    an expansion function, coupled with an input expansion port and an output expansion port, for communicating ATM cells in the upstream and downstream directions via the input and output expansion ports and for communicating ATM cells with the remote ATM-compatible interfaces, the input expansion port operable for coupling to the master unit, the output expansion port operable for coupling to another expansion unit.

5. In an expandable system for delivering to subscribers ATM-compatible services via a master unit, the master unit comprising:
   a predetermined number of local ATM-compatible interfaces, each operable to communicate the ATM-compatible services comprising ATM cells with a corresponding subscriber;
   an expansion function, coupled to the local ATM-compatible interfaces and to an expansion port, for communicating the ATM cells via the expansion port and for communicating the AIM cells with the local ATM-compatible interfaces; ad
   an ATM controller, coupled to an ATM-compatible network, to the local ATM-compatible interfaces, and to the expansion function, operable to process the ATM cells for distribution via the ATM-compatible network, the local ATM-compatible interfaces and the expansion port; and
   a Plain Old Telephone Service (POTS) interface, coupled to a Digital Line Carrier (DLC) system and to the local ATM-compatible interfaces, for communicating POTS signals between the DLC system and the subscribers serviced by the local ATM-compatible interfaces.

6. The master unit of claim 5, wherein the ATM controller comprises:
   an ATM network interface, coupled to the ATM-compatible network, for communicating the ATM cells with the ATM-compatible network;
   an ATM layer processor, responsive to the ATM cells received from the ATM-compatible network to allocate selected ones of the ATM cells for delivery by the local ATM-compatible interfaces or via the expansion port, the ATM layer processor further operable to combine selected ones of the ATM cells received from the local ATM-compatible interfaces or the expansion port for delivery to the ATM-compatible network; and
   a controller, coupled to the ATM network interface, the ATM layer processor, and the expansion function, for managing operations of the ATM controller and the expansion function.

7. The master unit of claim 5, wherein the expansion port is coupled to an expansion unit via a flexible expansion link, the expansion unit operable to expand the delivery of ATM-compatible services to an additional set of subscribers other Dan the subscribers serviced by the predetermined number of the local ATM-compatible interfaces.

8. The master unit of claim 7, wherein the master unit and the expansion unit comprise separate small form-factor assemblies, each capable of installation in different locations within a cabinet housing for a DLC 1 system.

9. The master unit of claim 7, wherein the expansion unit comprises:
   a plurality of remote ATM-compatible interfaces for communicating ATM cells associated with ATM-compatible services with the additional set of subscribers;
   an input expansion port for coupling to the expansion link to establish a communication link with the expansion port of the master unit; and
   an expansion function, coupled to the input expansion port, for communicating the ATM cells in upstream and downstream directions via the input expansion port and for communicating the ATM cells with the remote ATM-compatible interfaces.

10. The master unit of claim 9, wherein the expansion unit further comprises an output expansion port for connecting the expansion unit to another expansion unit via a second expansion link, the expansion function of the expansion unit coupled to the output expansion port for communicating the ATM cells in the upstream and downstream directions via the output expansion port and for communicating the ATM cells with the remote ATM-compatible interfaces.

11. An expandable system for delivering ATM-compatible services to an additional set of subscribers other than subscribers serviced by a predetermined number of local ATM-compatible interfaces available at a Digital Line Carrier (DLC) system, an expansion unit, comprising:
   a plurality of remote ATM-compatible interface for communicating ATM cells associated with the ATM-compatible services with the additional set of subscribers;
   an input expansion port for coupling to an expansion link to establish a communication link with the DLC system;
   an expansion function, coupled to the input expansion port, for communicating the ATM cells in the upstream and downstream directions via the input expansion port and for communicating the ATM cells with the remote ATM-compatible interfaces;
   a master unit located at the DLC system, coupled to the input expansion port, the master unit comprising:
   a predetermined number of the local ATM-compatible interfaces, each operable to communicate the ATM-compatible services comprising ATM cells with a corresponding subscriber;
   an expansion function, coupled to the local ATM-compatible interfaces and to an expansion port, for communicating the ATM cells via the expansion port and for communicating the ATM cells with the local ATM-compatible interfaces; and
   an ATM controller, coupled to an ATM-compatible network, to the local ATM-compatible interfaces, and to the expansion function, operable to process the ATM cells for distribution via the ATM-compatible network, the local ATM-compatible interfaces and the expansion port; and
   a Plain Old Telephone Service (POTS) interface, coupled to the DLC system and to the local ATM-compatible interfaces, for communicating POTS signals between the DLC system and the subscribers serviced by the local ATM-compatible interfaces.

12. The expandable system of claim 11, wherein the expansion unit further comprises an output expansion port for connecting the expansion unit to another expansion unit via an expansion link, the expansion function coupled to the output expansion port for communicating the ATM cells in the upstream and downstream directions via the output expansion port and for communicating the ATM cells with the remote ATM-compatible interfaces.

13. The expandable system of claim 11, wherein the ATM controller comprises:
   an ATM network interface, coupled to the ATM-compatible network, for communicating the ATM cells with the ATM-compatible network;
   an ATM layer processor, responsive to the ATM cells received from the ATM-compatible network to allocate selected ones of the ATM cells for delivery by the local ATM-compatible interfaces or via the expansion port, the ATM layer processor further operable to combine selected ones of the ATM cells received from the local ATM-compatible interfaces or the expansion port for delivery to the ATM-compatible network; and a controller, coupled to the ATM network interface, the ATM layer processor, and the expansion function of the master unit, for managing operations of the ATM controller and the expansion function.

14. An expandable system for delivering ATM-compatible services to an additional set of subscribers other than subscribers serviced by a predetermined number of local ATM-compatible interfaces available at a Digital Line Carrier (DLC) system, an expansion unit, comprising:
- a plurality of remote ATM-compatible interface for communicating ATM cells associated with the ATM-compatible services with the additional set of subscribers;
- an input expansion port for coupling to an expansion link to establish a communication link with the DLC system;
- an expansion function, coupled to the input expansion port, for communicating the ATM cells in the upstream and downstream directions via the input expansion port and for communicating the ATM cells with the remote ATM-compatible interfaces; and
- a master unit located at the DLC system, coupled to the input expansion port, the master unit comprising:
- a predetermined number of the local ATM-compatible interfaces, each operable to communicate the ATM-compatible services comprising ATM cells with a corresponding subscriber;
- an expansion function, coupled to the local ATM-compatible interfaces and to an expansion port, for communicating the ATM cells via the expansion port and for communicating the ATM cells with the local ATM-compatible interfaces; and
- an ATM controller, coupled to an ATM-compatible network, to the local ATM-compatible interfaces, and to the expansion function, operable to process the ATM cells for distribution via the ATM-compatible network, the local ATM-compatible interfaces and the expansion port, wherein the ATM controller comprises:
  - an ATM network interface, coupled to the ATM-compatible network, for communicating the ATM cells with the ATM-compatible network;
  - an ATM layer processor, responsive to the ATM cells received from the ATM-compatible network to allocate selected ones of the ATM cells for delivery by the local ATM-compatible interfaces or via the expansion port, the ATM layer processor further operable to combine selected ones of the ATM cells received from the local ATM-compatible interfaces or the expansion port for delivery to the ATM-compatible network; and
  - a controller, coupled to the ATM network interface, the ATM layer processor, and the expansion function of the master unit, for managing operations of the ATM controller and the expansion function.

15. The expandable system of claim 14, wherein the expansion unit further comprises an output expansion port for connecting the expansion unit to another expansion unit via an expansion link, the expansion function coupled to the output expansion port for communicating the ATM cells in the upstream and downstream directions via the output expansion port and for communicating the ATM cells with the remote ATM-compatible interfaces.

* * * * *